(12) United States Patent
Farmahini-Farahani et al.

(10) Patent No.: US 10,990,453 B2
(45) Date of Patent: Apr. 27, 2021

(54) IMPROVING LATENCY BY PERFORMING EARLY SYNCHRONIZATION OPERATIONS IN BETWEEN SETS OF PROGRAM OPERATIONS OF A THREAD

(71) Applicant: Advanced Micro Devices, Inc., Santa Clara, CA (US)

(72) Inventors: Amin Farmahini-Farahani, Santa Clara, CA (US); David A. Roberts, Wellesley, MA (US); Nuwan Jayasena, Cupertino, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 225 days.

(21) Appl. No.: 15/952,149

(22) Filed: Apr. 12, 2018

(65) Prior Publication Data
US 2019/0317831 A1 Oct. 17, 2019

(51) Int. Cl.
*G06F 9/52* (2006.01)
(52) U.S. Cl.
CPC ............ *G06F 9/52* (2013.01); *G06F 9/528* (2013.01)
(58) Field of Classification Search
CPC .................................... G06F 9/52; G06F 9/528
See application file for complete search history.

(56) References Cited

U.S. PATENT DOCUMENTS

| 7,398,403 | B2* | 7/2008 | Nishioka | G06F 1/3228 |
| | | | | 713/300 |
| 2005/0251657 | A1* | 11/2005 | Boucher | G06F 9/30087 |
| | | | | 712/218 |
| 2014/0033209 | A1* | 1/2014 | Lih | G06F 9/522 |
| | | | | 718/101 |
| 2015/0052537 | A1* | 2/2015 | Gaster | G06F 9/522 |
| | | | | 718/106 |

* cited by examiner

*Primary Examiner* — Jorge A Chu Joy-Davila
(74) *Attorney, Agent, or Firm* — Volpe Koenig

(57) ABSTRACT

A memory fence or other similar operation is executed with reduced latency. An early fence operation is executed and acts as a hint to the processor executing the thread that executes the fence. This hint causes the processor to begin performing sub-operations for the fence earlier than if no such hint were executed. Examples of sub-operations for the fence include operations to make data written to by writes prior to the fence operation available to other threads. A resolving fence, which occurs after the early fence, performs the remaining sub-operations for the fence. By triggering some or all of the sub-operations for a memory fence that will occur in the future, the early fence operation reduces the amount of latency associated with that memory fence operation.

22 Claims, 6 Drawing Sheets

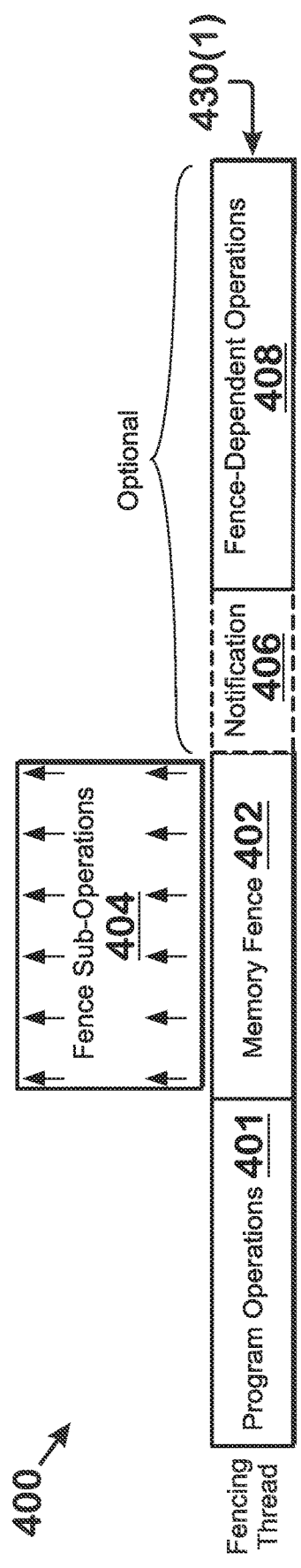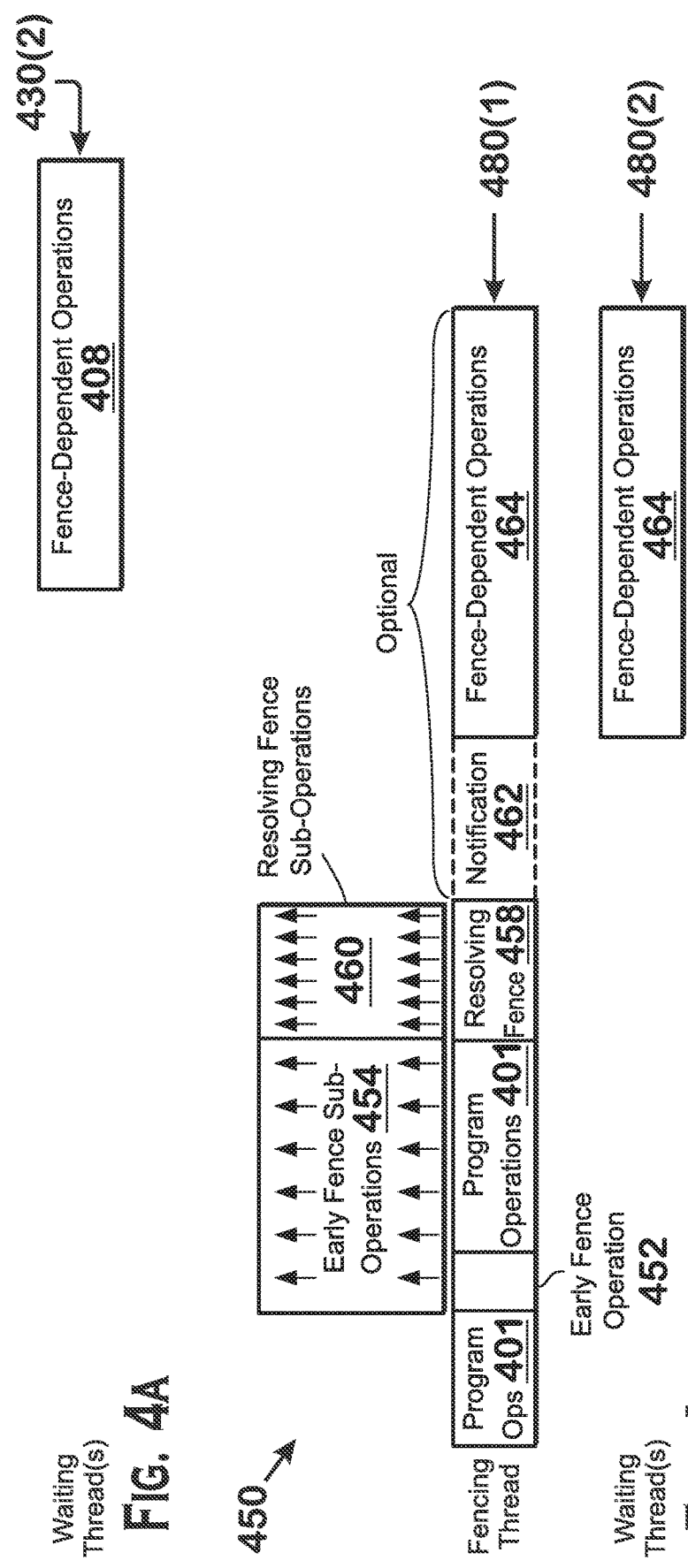

IMPROVING LATENCY BY PERFORMING EARLY SYNCHRONIZATION OPERATIONS IN BETWEEN SETS OF PROGRAM OPERATIONS OF A THREAD

BACKGROUND

Because threads represent different sequences of execution, threads cannot rely on execution flow order to manage data dependencies among them. Instead, threads must use inter-thread communication mechanisms, commonly referred to as thread synchronization mechanisms. Improvements in thread synchronization mechanisms are of interest to those skilled in the art.

BRIEF DESCRIPTION OF THE DRAWINGS

A more detailed understanding can be had from the following description, given by way of example in conjunction with the accompanying drawings wherein:

FIG. 4A is a timing diagram illustrating a unitary memory fence operation, according to an example;

FIG. 4B illustrates use of a split memory fence operation to hide the latency of at least part of the fence operations, according to an example.

DETAILED DESCRIPTION

Figure 1:
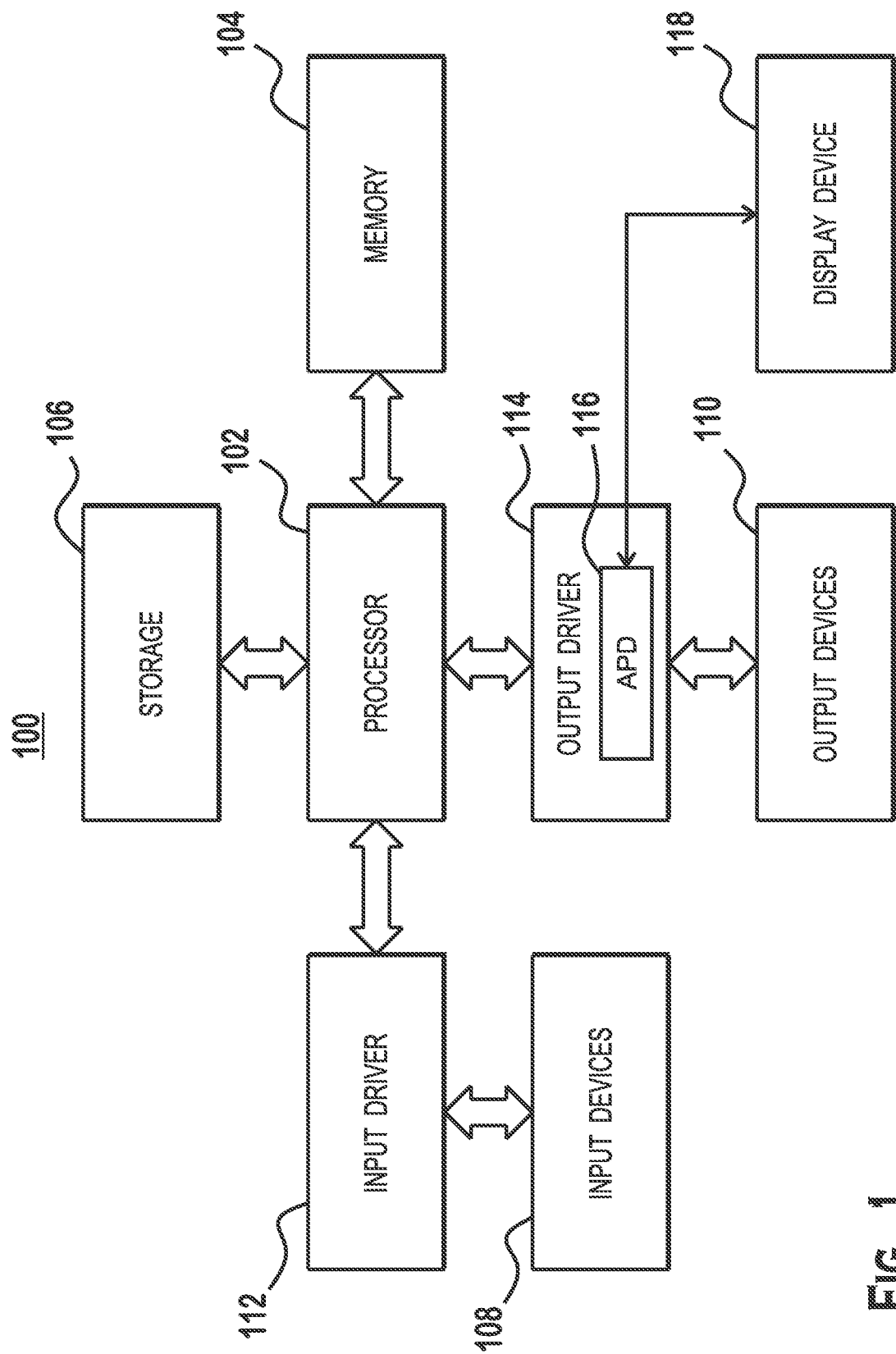
FIG. 1 is a block diagram of an example device in which one or more features of the disclosure can be implemented.

Techniques are provided herein to execute a memory fence or other similar operation with reduced latency as compared with traditional approaches. Although it is possible to use the techniques described herein for synchronization operations other than fence operations, much of the disclosure herein will refer simply to fence operations. It should be understood that when the disclosure describes use of the technique for fence operations, such description also applies to synchronization operations other than fence operations.

The techniques include executing an early fence operation. The early fence operation acts as a hint to the processor executing the thread that executes the fence. This hint causes the processor to begin performing sub-operations for the fence earlier than if no such hint were executed. Examples of sub-operations for the fence include operations to make data written to shared memory locations by writes prior to the fence operation "globally visible," where the term "globally visible" means available to other threads. In an example, the thread executing the fence is executing on one processor and other threads are executing on other processors. The thread executing the fence executes write operations, but there may be some latency between issuance of such write operations and when the data involved in such write operations are actually available to the threads on the other processors. The data becomes globally visible when that data is available to the threads on the other processors. In an example, making data globally visible includes writing that data to a shared memory available to the different processors executing the different threads. Other sub-operations of the fence are possible as well.

By triggering some or all of the sub-operations for a memory fence that will occur in the future, the early fence operation reduces the amount of latency associated with that memory fence operation. More specifically, traditionally, a memory fence operation is executed, which triggers a number of fence sub-operations. Execution of the thread cannot proceed until all such sub-operations are complete, which means that the thread experiences a certain amount of latency after executing the memory fence operation. A resolving fence, which occurs after the early fence, performs the remaining sub-operations for the fence. By initiating the sub-operations early, the amount of latency experienced by the thread for the memory fence operation is reduced.

Herein, the terms "store" and "write" will be used interchangeably and the terms "read" and "load" will be used interchangeably. The term "program order" will be used herein to refer to the order with which operations (e.g., computer instructions) are specified to be performed by a software program. It should be understood that due to the prevalence of out-of-order execution mechanisms, many processors re-order such operations such that at least portions of such operations are performed in an order different than program order (although such processors, in conjunction with software, are typically required to produce results as if the operations were completed in program order). In addition, memory fence operations are sometimes used to ensure that out-of-order execution appears to have occurred in order, as memory fence operations impose an ordering on operations that otherwise may occur at least partially out of order. It should be understood that re-ordering mechanisms could be used in the context of the system of the present disclosure, although such mechanisms will generally not be discussed explicitly herein.

FIG. 1 is a block diagram of an example device 100 that is capable of implementing one or more features of the disclosure, according to an example. In various examples, the device 100 is embodied as, or is at least a portion of, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. In various examples, the device 100 also includes additional components not shown in FIG. 1.

In various alternatives, the processor 102 includes or is embodied as a central processing unit (CPU), a graphics processing unit (GPU), a CPU and GPU located on the same die, or one or more processor cores, wherein each processor core is a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. In various implementations, these parallel processing units perform at least some of the operations described herein (such as executing threads and performing thread synchronization operations described herein).

Figure 2A:
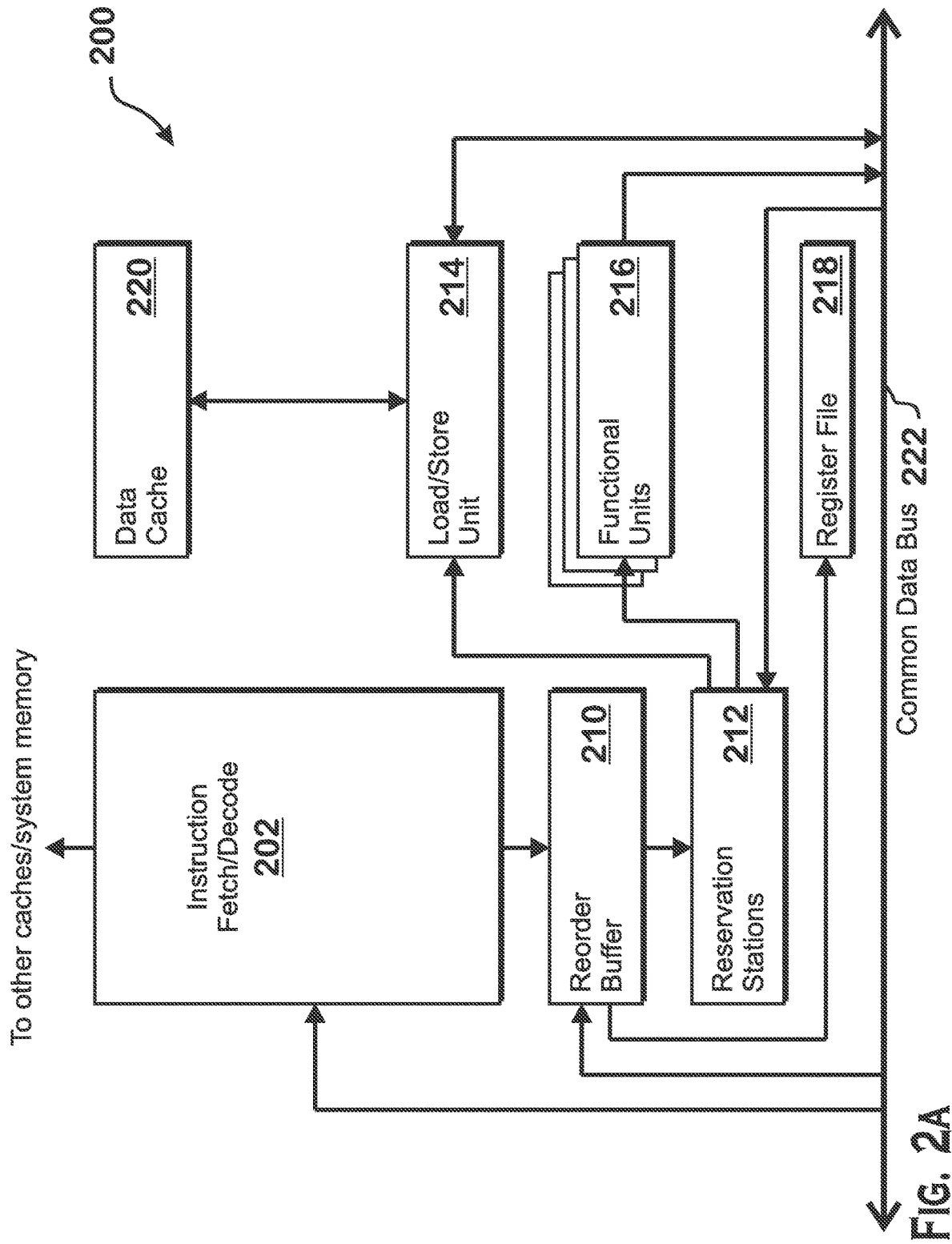
FIG. 2A is a block diagram of an instruction execution pipeline, included within the processor of FIG. 1, according to an example.

FIG. 2A is a block diagram of an instruction execution pipeline 200, included within the processor 102 of FIG. 1, according to an example. The instruction execution pipeline 200 retrieves instructions from memory and executes the instructions, outputting data to memory and modifying the state of elements within the instruction execution pipeline 200, such as registers within register file 218.

The instruction execution pipeline 200 includes an instruction fetch and decode unit 202 that fetches instructions from system memory (such as memory 104) via an instruction cache and decodes the fetched instructions. Decoding the fetched instructions converts the fetched instructions to micro-operations (also just "operations") for execution by the instruction execution pipeline 200. The term "instructions" refers to tasks that are specified in an instruction set architecture for the processor 102. Instructions can be specified for execution by software. Micro-operations are sub-tasks that are not generally directly usable by software. Instead, micro-operations are the individual tasks actually carried out by the processor 102 in order to perform the instructions requested by software. Decoding instructions thus includes identifying control signals to be applied to functional units 216, a load/store unit 214, and other portions of the instruction execution pipeline 200.

The execution pipeline 200 also includes functional units 216 that perform calculations to process the micro-operations, a load/store unit 214 that loads data from or stores data to system memory via a data cache 220 as specified by the micro-operations, and a register file 218 that includes registers that store working data for the micro-operations.

A reorder buffer 210 tracks instructions that are currently in-flight and ensures in-order retirement of instructions despite allowing out-of-order execution while in-flight. "In-flight" instructions refers to instructions that have been received by the reorder buffer 210 but have not yet "retired"—that is, have not yet had results committed to the architectural state of the processor (e.g., results written to architectural registers). When all micro-operations of an instruction have been performed, the instruction is considered to be retired. Reservation stations 212 maintain in-flight micro-operations and track operands for micro-operations. When all operands are ready for execution of a particular micro-operation, reservation stations 212 send the micro-operation to a functional unit 216 or a load/store unit 214 for execution.

Various elements of the instruction execution pipeline 200 communicate via a common data bus 222. For example, the functional units 216 and load/store unit 214 write results to the common data bus 222 which may be read by reservation stations 212 for execution of dependent instructions/micro-operations and by the reorder buffer 210 as the final processing result of an in-flight instruction that has finished execution. The load/store unit 214 also reads data from the common data bus 222. For example, the load/store unit 214 reads results from completed instructions from the common data bus 222 and writes the results to memory via the data cache 220 for store instructions.

Figure 2B:
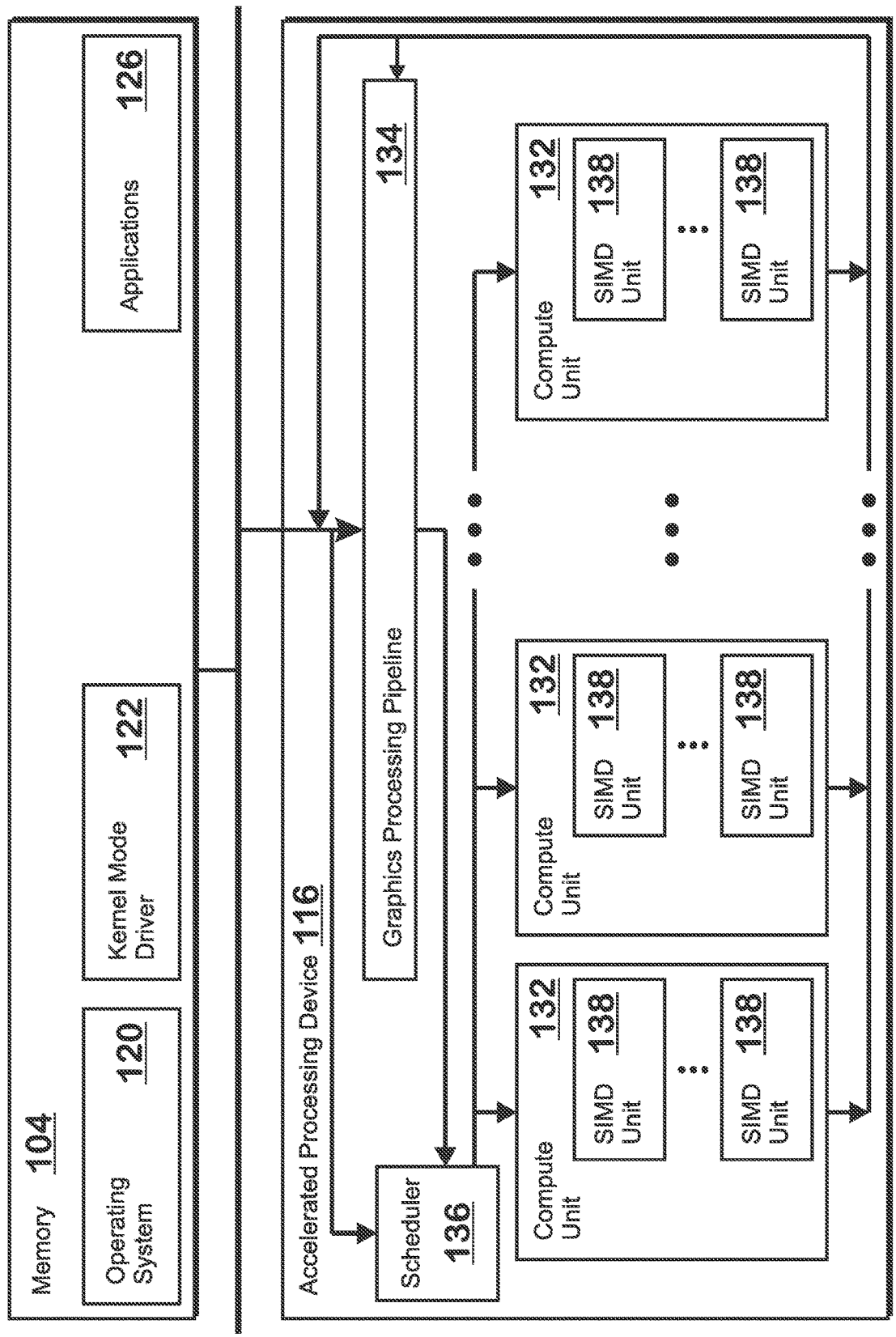
FIG. 2B is a block diagram of the device of FIG. 1, illustrating additional details related to execution of processing tasks on the APD, according to an example.

FIG. 2B is a block diagram of the device 100, illustrating additional details related to execution of processing tasks on the APD 116, according to an example. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. A wavefront can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Various processors of the device 100, such as the processor 102, the APD 116, or other processors within the device 100, are capable of execution in a multithreaded manner. Multithreaded execution is a form of parallel execution in which different execution threads (e.g., processes, applications, or portions thereof) execute during the same time period. Some software relies on thread synchronization to operate correctly. Because threads represent different sequences of execution, the threads cannot rely on execution flow order to manage data dependencies among them. Instead, threads must use inter-thread communication mechanisms.

One mechanism for facilitating inter-thread communication is a memory fence operation. A memory fence operation (also commonly referred to as a memory barrier instruction or operation) helps to enforce an ordering of memory operations issued by a thread by ensuring that certain specified memory operations are completed and any resulting effects are made visible to other threads in the system before other subsequent memory operations occur. Memory fence operations have various "flavors" or types. Memory fence operations are differentiated based on the types of memory operations for which ordering is enforced.

In one example, a write fence executed in a particular thread causes memory operations of that thread that occur after the write fence in program order to not complete until all write instructions prior to the write fence in program order are considered globally visible. The term "globally visible" means that all entities (e.g., threads, processors, or other execution entities) that attempt to read the data of the writes prior to the write fence are able to read the data specified by those writes, as opposed to older, and thus stale, data. In a straightforward implementation, a write fence stalls the thread that executes the write fence until the data to be written by all writes previous to the write fence is able to be read by the other entities (such as the other threads, processors, or other execution entities). Other implementations of memory fences are also possible as long as they maintain the above-described semantics. Write fences assist with thread synchronization by ensuring that intended results from the thread executing the fence are available to other threads when the fence completes, thereby allowing such other threads to execute based on those intended results rather than based on older, "stale" data. In essence, a write fence ensures ordering of operations for particular threads with respect to write operations of the thread executing the write fence.

Other fence types are possible, such as a read fence, which causes all read instructions after the barrier to wait for the barrier to finish in order to execute. A read/write fence is a combination of read and write fences above, and other types of fences may exist.

Figure 3:
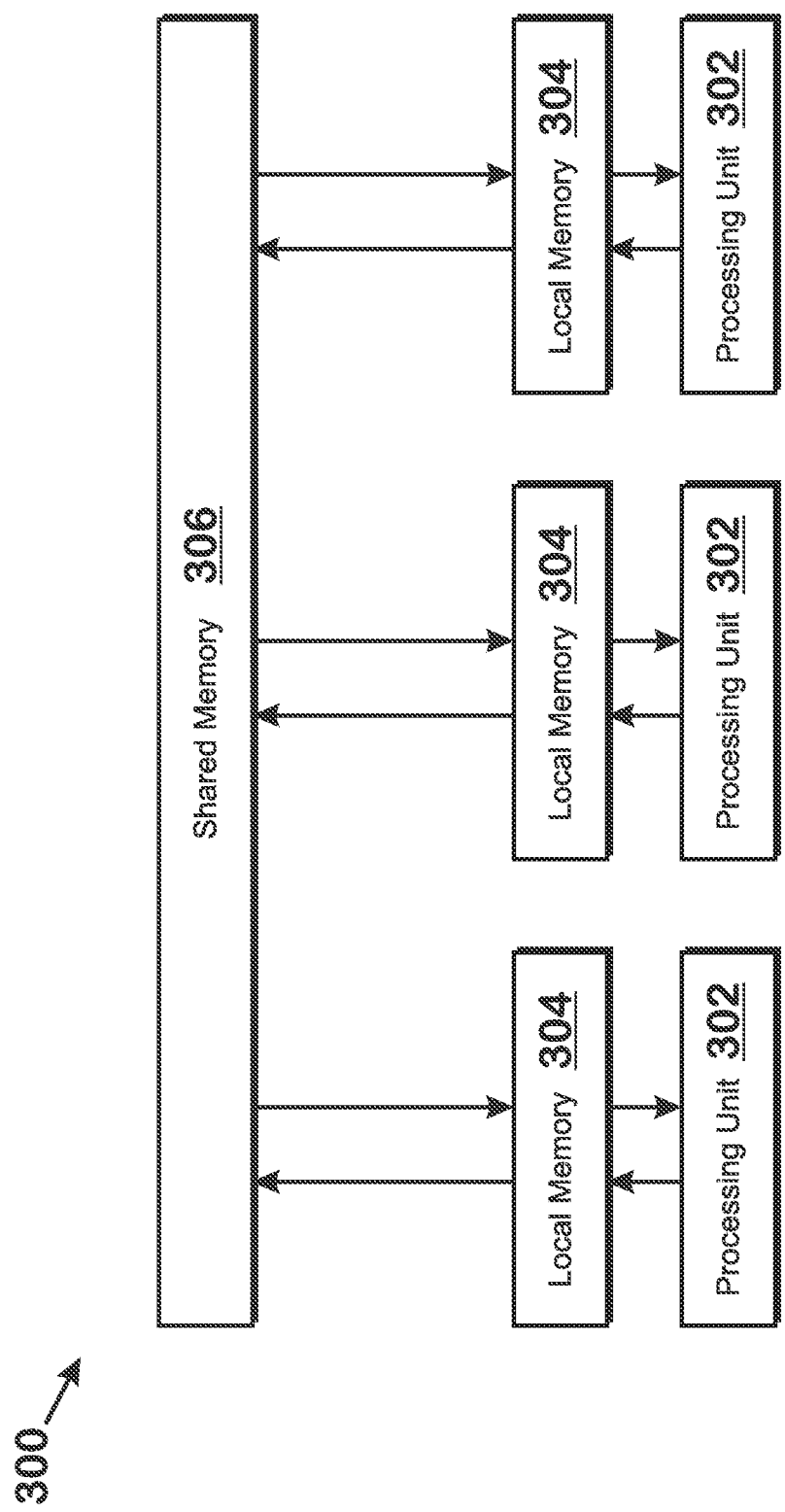
FIG. 3 illustrates aspects of a processing system 300 capable of performing memory fence operations, according to an example.

Memory fence operations are typically associated with high latency due to the number and types of operations involved. FIG. 3 illustrates aspects of a processing system 300 capable of performing memory fence operations, according to an example. The processing system 300 includes multiple processing units 302, multiple local memories 304, and a shared memory 306. Each processing unit 302 has direct access to an associated local memory 304, and has direct, though longer-latency, access to the shared memory 306, but does not have direct access to the local memory 304 associated with other processing units 302.

Each processing unit 302 represents any processing unit capable of executing instructions including memory fence instructions. Examples of such processing units include microprocessors, microcontrollers, or any other type of processor. One or more of processing units 302 may be one or more processors 102 of the system 100 of FIG. 1, different individual cores of the processors 102 of the system 100 of FIG. 1, one or more SIMD units 138 or compute units 132 of the APD 116 of FIGS. 1 and 2. In one example, the system 100 includes multiple processors 102 and each of the processing units 302 is one of the processors 102. In another example, the system 100 includes one or more processors 102 and each of the processing units is a different core of one of the processors 102. In yet another example, each of the processing units 302 is a different compute unit 132 of the APD 116. In yet another example, each of the processing units 302 is a different SIMD unit 138 of the same or different compute units 132.

Each local memory 304 includes memory directly accessible by the processing units 302. In various examples, such local memories 304 include low level cache memories. The shared memory 306 includes memory that is larger than but less quickly accessible than the local memories 304, such as higher level cache memories.

Data is communicated between different processing units 302 via the shared memory 306. For example, a processing unit 302 writes data into the shared memory 306 and a different processing unit 302 reads data from that shared memory. Due to the low-latency nature of the local memory 304, a typical pattern is for a processing unit 302 to manipulate data in its respective local memory 304 and to write out such data to the shared memory 306 or to read needed data from the shared memory 306 when needed.

In general, memory accesses by any particular processing unit 302 are not ordered with respect to memory accesses by other processing units 302. As described above, memory fence operations can be used to delineate well-defined points in the memory access sequence of each processing unit that can be used to enforce such ordering. Memory fence operations are typically associated with a relatively large amount of latency due to transactions that occur between the local memory 304 and the shared memory 306. In an example, a write fence operation stalls the thread issuing the write fence operation until data stored in the local memory 304 is written to the shared memory 306, thus becoming globally visible to the other processing units 302. Writing such data to the shared memory 306 at least incurs the latency of memory accesses made to the shared memory 306, which can be rather large compared to the clock cycle time. Memory fence operations may involve other high-latency operations as well. Thus, overall, memory fence operations are high latency operations.

Because of this high latency, software with multiple memory fence operations experience a level of latency. Techniques are proposed herein to reduce the latency involved with memory fence operations. Generally, these techniques involve splitting a memory fence operation into two different operations: an early fence operation and a resolving fence operation. The early fence operation initiates some of the higher latency operations associated with the memory fence operation. Herein, the traditional, non-split memory fence operation, will sometimes be referred to as a "unitary fence operation," a "full fence operation," or a "non-split fence operation."

Execution of the thread executing the early fence operation is allowed to continue before completion of the early fence operation. Thus the early fence operation allows some of the operations to occur while also allowing other instructions to execute. This form of execution is different than with a unitary fence operation, because with a unitary fence operation, the memory fence operations begin to occur when the fence operation is executed, but the thread executing that fence operation cannot proceed to instructions past the fence operation. The split fence operation hides at least a part of the latency of the memory fence by allowing at least some operations of the memory fence to occur while other operations for the thread are occurring as well. FIGS. 4A and 4B illustrate these distinctions between the split fence operation and the non-split fence operation.

FIG. 4A is a timing diagram 400 illustrating a unitary memory fence operation, according to an example. The timing diagram 400 includes two timing diagram rows: a fencing thread timing diagram row 430(1) and a waiting thread timing diagram row 430(2). The fencing thread timing diagram row 430(1) illustrates operations for the thread that executes the fence operation and the waiting thread timing diagram row 430(2) illustrates operations for the thread that is waiting on the fencing thread. It is of course possible for there to be no threads waiting for a particular memory fence operation to occur. Thus, the waiting thread timing diagram row 430(2) is optional and is provided for illustrative purposes only.

The earliest operations illustrated in FIG. 4A are program operations 401 before a memory fence operation 402. These program operations 401 are operations prior to the memory fence 402 in program order and represent whatever instructions exist in the thread prior to the memory fence 402 in program order. The next instruction is the memory fence operation 402. As described elsewhere herein, the memory fence operation 402 triggers certain other operations to occur. These other operations are referred to as "fence sub-operations" herein and are illustrated in FIG. 4A as fence sub-operations 404.

Fence sub-operations 404 include various operations performed within (and/or external to) the processing unit 302 executing the fencing thread to satisfy the requirements of the memory fence operation 402. The specific fence sub-operations 404 are operations that are triggered based on the type of memory fence operation that is executed, and may be based on other aspects of the system on which the fencing thread is running.

In one example, the memory fence operation is a write fence operation and the fence sub-operations 404 include operations to write data from a local memory 304 to a shared memory 306, thus making that data "globally visible." The fence sub-operations 404 for such a write fence operation may include other memory operations. In other examples, the memory fence 402 operation is a type of memory fence operation other than a write fence operation, and the fence sub-operations 404 include other appropriate operations. The memory fence operation 402 concludes when all fence sub-operations 404 are complete. After all fence sub-operations 404 are complete, the fencing thread proceeds with instructions subsequent to the memory fence operation 402 in program order. In FIG. 4A, these subsequent instructions include notifying one or more waiting threads that the memory fence operation 402 has completed (via notification 406) and performing one or more fence-dependent operations 408 (i.e., operations dependent on the results of data involved in the memory fence 402). The waiting thread is also shown as performing fence-dependent operations 408 after receiving the notification 406.

FIG. 4B illustrates use of a split memory fence operation to hide the latency of at least part of the fence operation, according to an example. In FIG. 4B, a fencing thread timing diagram row 480(1) and a waiting thread timing diagram row 480(2) are illustrated. The fencing thread timing diagram row 480(1) illustrates program operations 401, an early fence operation 452, and a resolving fence operation 458, as well as the notification 462 (which is similar to the notification 406 in that the notification 462 notifies the waiting thread that the resolving fence operation 458 is complete) and the fence-dependent operations 464. The program operations 401 are shown both before the early fence operation 452 and between the early fence operation 452 and the resolving fence operation 458, and are similar to the program operations 401 of FIG. 4A. After the first set of program operations 401, the fencing thread performs the early fence operation 452, which causes the processing unit 302 on which the fencing thread is executing to begin performing the early fence sub-operations 454. The fencing thread also performs the remainder of the program operations 401 after the early fence operation 452 is performed. Note that the processing unit 302 on which the fencing thread executes the early fence operation 452 is capable of performing at least some of the program operations 401 in an overlapping time period with the early fence sub-operations 454 (although such overlap is not strictly necessary in all situations—for example, it is possible for early fence sub-operations 454 to be non-existent, to complete prior to the second set of program operations 401 beginning, or to not be performed in an overlapping time period with the second set of program operations 401 for other reasons). In other words, the processing unit 302 is able to perform the early fence operation 452, which initiates the early fence sub-operations 454, and then perform the second set of program operations 401 while at least some of the early fence sub-operations 454 are being performed.

After performing the second set of program operations 401, the fencing thread performs the resolving fence operation 458. The resolving fence operation 458 triggers resolving fence sub-operations 460, which are the sub-operations remaining for the memory fence that were not performed in the early fence sub-operations 454. The fencing thread does not continue after the resolving fence operation 458 until the early fence sub-operations 454 and the resolving fence sub-operations 460 are complete. Once the early fence sub-operations 454 and the resolving fence sub-operations 460 are complete, the fencing thread continues with program execution. In FIG. 4B, this continuation involves performing the notification 462 by the fencing thread and the fence-dependent operations 464 by the fencing thread and the waiting threads.

Some examples of fence sub-operations are now described. One example is flushing of store queues within the processor core executing a fence that requires completion of stores. Store queues are used to hold pending store operations that have been issued by the processor but have not yet become globally visible. Flushing the store queues causes the data for those store operations to become globally visible. Another example is flushing dirty data in non-coherent caches on a fence that requires completion of stores. Flushing dirty data is similar to flushing store queues except that the data is stored in a cache instead of in a store queue. Flushing dirty data makes such dirty data globally visible, e.g., by placing it in a shared memory (such as shared memory 306). Another example is flushing all data in non-coherent caches on a fence that requires visibility of data written by other cores. In this context, an acquire operation indicates that the processor is beginning operations that may depend on data from some other processor. Writes by other processors that have been performed previously are now made locally visible. To make writes by other processors visible, data in non-coherent caches are flushed before continuing beyond the fence so new data can be pulled by the processor from the globally visible memory locations.

In addition to the above, in various implementations, fence sub-operations also include one or more speculatively performed optimizations. One example of such a speculatively performed operation is gaining cache coherence ownership permissions for any variables specifically associated with the upcoming resolving release. More specifically, the upcoming resolving release may include release of a lock or semaphore variable that is updated immediately following the resolving fence. One example is where the fence operation is part of a lock operation. A lock operation is an operation in which a lock variable is used by one thread to signal one or more other threads. Typically (although not necessarily), a particular value written to the lock variable indicates that the lock is obtained by a thread, while another value written to the lock variable indicates that the lock is free. To ensure correct ordering of operations, acquiring or releasing a lock includes a memory fence operation before the actual write to the lock variable. Thus, the memory fence operation described herein sometimes is associated with a lock variable. In some situations, a prerequisite to writing to a variable, such as a lock variable, is obtaining appropriate cache coherence permissions for that variable. Thus, in some implementations, for a memory fence operation associated with obtaining ownership to write to a variable such as a lock variable, the early fence sub-operations 454 includes a sub-operation to obtain coherence permissions of the associated variable.

Another example of a speculatively performed operation is demoting cache coherence permissions of data written prior to the memory fence (such as within the critical section of a code segment—i.e., the portion of code between a lock acquire operation and a lock release operation) from "modified" or "owned" (or another exclusive ownership state) to a "shared" state so that subsequent readers of that data will have more efficient, faster access. More specifically, in a cache-coherent, shared memory system, when a thread writes data to a memory address, that data is marked as exclusive (such as marked as modified or owned). In order for another thread to read exclusive data, that thread must first convert that data to a non-exclusive cache coherence state. Thus, in some situations, the early fence sub-operations 454 include an operation to demote the data written to by instructions in the critical section from an exclusive state to a shared state in order to reduce the latency of accessing such data by threads other than the thread that owned the lock after the lock is released (i.e., in the fence-dependent operations 464).

Yet another example of a speculatively performed operation is raising the priority of other fence sub-operations so that those fence sub-operations are completed more quickly. In an example, as described above, the early fence sub-operations 454 include operations to initiate making certain data globally visible faster. In such an example, the early fence operation 452 includes an operation to raise the priority of one or more of the early fence sub-operations 454 that make certain data globally visible, thereby increasing the speed of such operations.

It is possible for the processing unit 302 to reorder the early fence operation 452 with respect to other instructions, such as other memory instructions, prior to the early fence operation 452. Instruction re-ordering typically occurs in most processors, but it is typically not allowed or impossible to reorder certain types of instructions (e.g., memory accesses that are ordered by the fence operation) with respect to a memory fence operation. However, the early fence operation 452 is simply an optimization or hint to the processing unit 302. If the early fence operation 452 were performed earlier or later than memory instructions before or after the early fence operation 452, that would simply mean that the early fence sub-operations 454 would be performed for more or less of the data involved in the re-ordered memory instructions. However, memory operations would still have the opportunity to be completed by the resolving fence sub-operations 460. In an example, two memory write instructions exist before the early fence operation 452 in program order. However, in execution, the processing unit 302 reorders the operations such that the first memory write instruction is executed before the early fence operation 452 but the second memory write instruction is executed after the early fence operation 452. In this situation, the early fence sub-operations 454 can help initiate making the data of the first memory write instruction globally visible (for example, by flushing of store queues or by flushing dirty data in non-coherent caches), but the early fence sub-operations 454 do not include an operation to initiate making the data of the second memory write instruction globally visible. Regardless, however, the resolving fence sub-operations 460 would make sure that the most recently written values written to the addresses specified by write operations prior to the resolving fence operation 458 are globally visible. Thus, the resolving fence sub-operations 460 would include an operation to make the data from the second memory write instruction globally visible (assuming that data is the most recently written data to the address specified by the second memory write instruction and that no memory write instructions in the other non-fence operations 456 wrote to that memory address).

As described elsewhere herein, it is possible for memory fence operations to be differentiated by type, such as read fence, write fence, or the like. It is similarly possible for early fence operation 452 and resolving fence operation 458 to be differentiated by type. Such typed early fence operation 452 and resolving fence operation 458 would function in a similar manner with regards to similarly typed unitary memory fence operations, but would operate in the manner described with respect to FIG. 4B.

There are a variety of ways in which the early fence operation 452 may be implemented. In one example, the early fence operation 452 is an explicit instruction in the instruction set architecture of the processing unit 302 on which the fencing thread executes. In this example, when the compiler compiles code that includes a memory fence or code that would be compiled into instructions including a memory fence, the compiler includes both an early fence instruction and a resolving fence instruction. When these instructions are executed, the processing unit 302 performs the operations described elsewhere herein (e.g., with respect to FIG. 4B).

The compiler may place the early fence instruction 452 and the resolving fence instruction 458 either at a location specified by the programmer or at a location automatically determined by the compiler at compile time. Examples of locations automatically determined at compile time include locations in the compiled machine code that allow for a significant number of memory fence sub-operations to be performed in the early fence sub-operations 454, in order to reduce the number of memory fence sub-operations performed in the resolving fence operations 460. More specifically, the early fence operation 452 and resolving fence operation 458 can be considered part of a unified memory fence construct. This unified memory fence construct acts as if a traditional, non-split memory fence were performed at a location in the compiled machine code specified by a particular program order. This location corresponds to the location of a unitary memory fence operation in "traditional" implementations that use the unitary memory fence operation, as opposed to the split memory fence operation described herein. In other words, the result of performing the early fence 452 and the resolving fence 458 should be the same as if a single unified memory fence instruction were performed at a particular location in program order.

Taking a write fence as an example, a program that includes a traditional unitary write fence is executed such that the data for all writes before the write fence is globally visible before proceeding past the write fence. A corresponding combination of the early fence operation 452 and the resolving fence operation 458 must produce the same result. Thus, the combination of the early fence operations 454 and the resolving fence operations 460 must produce the same result as the fence operations 404 of an "equivalent" unitary memory fence operation 402.

The early fence operation 452 performs the fence sub-operations of the unified fence operation that can occur at the point the early fence operation 452 is executed. For example, with a write fence, the early fence operation 452 would cause data from write operations that have already been performed but that are not stored in the shared memory 306 to be written out to the shared memory 306, thus becoming globally visible. The resolving fence operation 458 would cause the remaining data, such as data generated and written out in write operations after execution of the early fence operation 452 but before execution of the resolving fence operation 458 to be written to the shared memory 306, thus becoming globally visible.

In an alternative, instead of being implemented as an instruction in the instruction set architecture, the early fence operation is triggered upon writing to a specific memory address.

In an alternative implementation, the early fence operation 452 is not implemented as an instruction in an instruction set architecture of the processing unit 302. Instead, the processing unit 302 splits unitary memory fence instructions already in software and performs both an early fence operation 452 and a resolving fence operation 458. In different implementations, the processing unit 302 detects that a normal fence operation 402 (which would be the resolving fence operation in the split fence operation construct) is present in a stream of instructions to be executed in various ways, such as through speculative execution of instructions or through a prediction mechanism. Various prediction mechanisms are possible. Some examples of prediction mechanisms include tracking based on program counter, such as identifying a particular sequence of program counter values (which would indicate a particular program control flow) that is associated with an upcoming fence operation, and identifying access to one or more specific memory addresses (which could also be construed as indicating a particular program control flow) that are associated with an upcoming fence operation. In response to such a detection, the processing unit 302 places an early fence operation 452 at a location in the stream of instructions earlier than the memory fence instruction and/or initiates the early fence sub-operation 454 prior to the memory fence instruction, and treat the memory fence instruction as a resolving fence operation 458.

Figure 5:
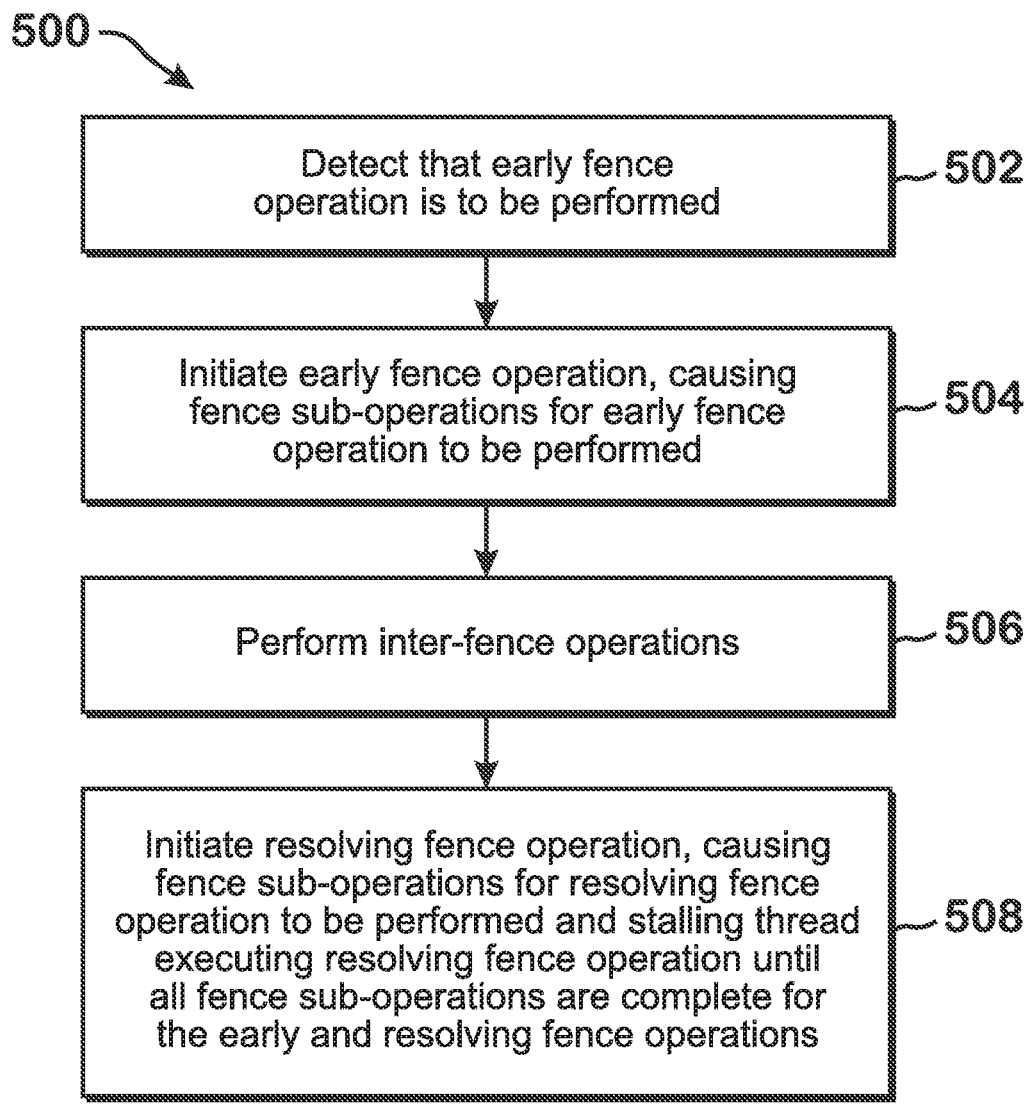
FIG. 5 is a flow diagram of a method for hiding latency of a synchronization operation, according to an example.

FIG. 5 is a flow diagram of a method 500 for hiding latency of a synchronization operation, according to an example. Although described with respect to the system of FIGS. 1-4B, it should be understood that any system capable of performing the method in any technically feasible order could alternatively perform the method 500.

The method 500 begins at step 502, where a processing unit 302 detects that an early fence operation is to be performed. As described elsewhere herein, various mechanisms may be used to determine that an early fence operation is to be performed. In one example, the machine instructions being executed include an explicit instruction to perform the early fence operation or include a write instruction that writes to a memory address that causes the early fence operation to be performed. In another example, the machine instructions only include a unitary fence operation but the processing unit 302 predicts that such a unitary fence operation will be executed prior to actually executing that instruction and performs an early fence operation prior to such execution. Various prediction mechanisms may be used to make this prediction, such as mechanisms based on the program counter, based on memory accesses, or the like.

At step 504, the processing unit 302 executing the thread initiates the detected early fence operation. Initiating the early fence operation causes early fence sub-operations for the early memory fence operation to be performed. As described elsewhere herein, these early fence sub-operations include operations that would be performed by the resolving fence (or by a unitary fence operation in a system that does not use early and resolving fence operations) and that can be performed at the point in execution of the early fence. Of course, operations for the resolving fence that cannot be performed until later on in execution (such as operations to flush dirty data for writes that execute after the early fence operation) cannot be performed for the early fence operation and are not performed until the resolving fence operation.

At step 506, the processing unit 302 performs inter-fence operations (e.g., the program operations 401 of FIG. 4B). These are simply operations that may be unrelated to the early fence or resolving fence operations, such as instructions in between the early fence operation and the resolving fence operation in program order. Notably, it is possible for these inter-fence operations to be performed in an overlapping time period as the time period in which the early fence sub-operations are performed.

At step 508, the processing unit 302 initiates the resolving fence operation. This resolving fence operation stalls (i.e., does not allow the results of execution for instructions past the resolving fence operation to be committed) the thread executing that operation until all resolving fence sub-operations are complete for both the early fence operation and the resolving fence operation.

It should be understood that the early fence operation can be thought of as a "hint" or optimization for the processing unit 302. Thus, the resolving fence operation can be thought of as being a normal or "traditional" fence operation while the early fence operation can be thought of as a hint-type instruction to improve performance of the traditional fence operation.

The disclosure herein describes techniques for using an early fence operation and a resolving fence operation in place of a "traditional" fence operation that has a particular time slot in program order. These techniques hide latency for at least part of the traditional fence operation by allowing some of the operations of the fence operation to occur earlier than the time slot of execution of the memory fence operation. Hiding latency is accomplished by performing an early fence operation which begins at least some of the sub-operations to be performed for the fence operation. These sub-operations can be performed in an overlapping time period with other non-fence operations prior to the program-order execution point of the fence operation. A resolving fence operation is performed at the program-order execution point of the fence operation, and performs the remaining sub-operations for the memory fence operation.

It should be understood that it is also possible to apply the techniques described herein as being performed for memory fence operations to other types of synchronization operations. Some examples of other types of synchronization operations include semaphores, load-acquire and store-release operations, and barriers. A semaphore is a variable or data structure that controls access to data structures accessible to and shared by different threads. Applying the techniques described herein to semaphores includes providing a hint to a waiting thread on a semaphore that the requested data structures would be soon ready for use. The waiting thread can be notified by an early fence operation to become ready to execute (for example, the waiting sleeping thread can be woken up) even before the semaphore is "signaled" and requested data structures are ready for use.

A load-acquire operation is an operation that imposes ordering on a read operation that reads from shared memory or a read-modify-write operation that reads from shared memory with respect to other read or write operations that precede the load-acquire operation in program order. Applying the techniques described herein to a load-acquire operation includes flushing data in non-coherent caches for a fence that requires visibility of data written by other cores (e.g., on load-acquire operations)—flushing some of the operations can happen early per the techniques of the present disclosure.

A store-release operation is an operation that imposes ordering on a write operation that writes to shared memory or a read-modify-write operation that writes to shared memory with respect to other read or write operations that follow the store-release operation in program order. Applying the techniques described herein to a store-release operation includes performing the following early: flushing store queues within the processor core executing a fence that requires completion of stores. Store queues are used to hold pending store operations that have been issued but have not yet been fully committed (i.e., full reflected in the cache hierarchy and/or memory system). Techniques proposed herein can also be applied to barriers implemented fully in hardware. For barriers, threads that are approaching a barrier flag their approach to the barrier by issuing their own early fence operations independently. For at least some early fence operations, a hint is provided to the hardware to initiate necessary operations for the corresponding thread. Once all threads have flagged their early fence operations, the operations associated with final early fence are initiated. For example, the operations associated with waking up waiting threads on the barrier can be initiated.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for executing a thread synchronization operation, the method comprising:

detecting an early synchronization operation between multiple sets of program operations of a first thread;

initiating the early synchronization operation, causing early synchronization sub-operations for the early synchronization operation to be performed, wherein the early synchronization sub-operations comprise operations to make data available to threads other than the first thread, wherein the data is written by program operations of the first thread;

performing inter-synchronization operations, the inter-synchronization operations comprising a set of the multiple sets of the program operations between the early synchronization operation and a resolving synchronization operation in program order, at least one of the inter-synchronization operations being performed in an overlapping time period with the early synchronization sub-operations;

initiating a resolving synchronization operation, causing resolving synchronization sub-operations for the resolving synchronization operation to be performed; and notifying a second thread that the resolving synchronization operation has been performed.

2. The method of claim 1, wherein the resolving synchronization operation causes the first thread to be stalled until the early synchronization sub-operations and the resolving synchronization sub-operations are complete.

3. The method of claim 1, wherein the first thread is allowed to proceed past, and is not blocked by, the early synchronization operation.

4. The method of claim 1, wherein detecting that the early synchronization operation is to be performed for the first thread comprises:
identifying an instruction explicitly requesting performance of the early synchronization operation.

5. The method of claim 1 wherein detecting that the early synchronization operation is to be performed for the first thread comprises:
automatically inserting an early synchronization operation into the instruction stream for the first thread.

6. The method of claim 5, wherein automatically inserting the early synchronization operation is performed in response to a prediction that the resolving synchronization operation will be performed.

7. The method of claim 5, wherein automatically inserting the early synchronization operation is performed by a compiler in response to code analysis.

8. The method of claim 1, wherein:
the operations of the first thread are prior to the early synchronization operation in program order.

9. The method of claim 1, wherein the early synchronization sub-operations include operations configured to flush dirty data from a cache local to a processor executing the first thread into memory shared between multiple processors.

10. A system for executing a thread synchronization operation, the system comprising:
a processor; and
a memory storing instructions that, when executed by the processor, cause the processor to execute the thread synchronization operation by:
detecting an early synchronization operation between multiple sets of program operations of a first thread;
initiating the early synchronization operation, causing early synchronization sub-operations for the early synchronization operation to be performed, wherein the early synchronization sub-operations comprise operations to make data available to threads other than the first thread, wherein the data is written by program operations of the first thread;
performing inter-synchronization operations, the inter-synchronization operations comprising a set of the multiple sets of the program operations between the early synchronization operation and a resolving synchronization operation in program order, at least one of the inter-synchronization operations being performed in an overlapping time period with the early synchronization sub-operations;
initiating a resolving synchronization operation, causing resolving synchronization sub-operations for the resolving synchronization operation to be performed; and
notifying a second thread that the resolving synchronization operation has been performed.

11. The system of claim 10, wherein the resolving synchronization operation causes the first thread to be stalled until the early synchronization sub-operations and the resolving synchronization sub-operations are complete.

12. The system of claim 10, wherein the first thread is allowed to proceed past, and is not blocked by, the early synchronization operation.

13. The system of claim 10, wherein detecting that the early synchronization operation is to be performed for the first thread comprises:
identifying an instruction explicitly requesting performance of the early synchronization operation.

14. The system of claim 10 wherein detecting that the early synchronization operation is to be performed for the first thread comprises:
automatically inserting an early synchronization operation into the instruction stream for the first thread.

15. The system of claim 14, wherein automatically inserting the early synchronization operation is performed in response to a prediction that the resolving synchronization operation will be performed.

16. The system of claim 14, wherein automatically inserting the early synchronization operation is performed by a compiler in response to code analysis.

17. The system of claim 10, wherein:
the operations of the first thread are prior to the early synchronization operation in program order.

18. The system of claim 10, wherein the early synchronization sub-operations include operations configured to flush dirty data from a cache local to a processor executing the first thread into memory shared between multiple processors.

19. A system for executing a thread synchronization operation, the system comprising:
a first processor configured to execute a first thread;
a second processor configured to execute a second thread;
a shared memory accessible by both the first thread and the second thread; and
a memory storing instructions that, when executed by the processor, cause the processor to execute the thread synchronization operation by:
detecting an early synchronization operation between multiple sets of program operations of the first thread;
initiating the early synchronization operation, causing early synchronization sub-operations for the early synchronization operation to be performed, wherein the early synchronization sub-operations comprise operations to make data available to threads other than the first thread, wherein the data is written by program operations of the first thread;

performing inter-synchronization operations, the inter-synchronization operations comprising a set of the multiple sets of the program operations between the early synchronization operation and a resolving synchronization operation in program order, at least one of the inter-synchronization operations being performed in an overlapping time period with the early synchronization sub-operations;

initiating a resolving synchronization operation, causing resolving synchronization sub-operations for the resolving synchronization operation to be performed; and notifying the second thread that the resolving synchronization operation has been performed.

20. The system of claim 19, wherein the first thread is allowed to proceed past, and is not blocked by, the early synchronization operation.

21. The method of claim 1, wherein the resolving synchronization sub-operations comprise second operations to make second data available to threads other than the thread, wherein the second data is written by operations of the thread prior to the resolving synchronization operation in program order, wherein the second data includes data not made available to threads other than the thread by the early synchronization sub-operations.

22. The system of claim 10, wherein the resolving synchronization sub-operations comprise second operations to make second data available to threads other than the thread, wherein the second data is written by operations of the thread prior to the resolving synchronization operation in program order, wherein the second data includes data not made available to threads other than the thread by the early synchronization sub-operations.

* * * * *